(12) United States Patent
Yoda

(10) Patent No.: US 10,981,669 B2
(45) Date of Patent: Apr. 20, 2021

(54) AIRCRAFT LAMP

(71) Applicant: Koito Manufacturing Co., Ltd., Tokyo (JP)

(72) Inventor: Takashi Yoda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/535,352

(22) Filed: Aug. 8, 2019

(65) Prior Publication Data

US 2020/0047917 A1    Feb. 13, 2020

(30) Foreign Application Priority Data

Aug. 10, 2018   (JP) ............................. JP2018-151946

(51) Int. Cl.
   *F21V 29/83*   (2015.01)
   *F21V 15/01*   (2006.01)
   *B64D 47/02*   (2006.01)
   *F21W 107/30*  (2018.01)

(52) U.S. Cl.
   CPC .............. *B64D 47/02* (2013.01); *F21V 15/01* (2013.01); *F21V 29/83* (2015.01); *F21W 2107/30* (2018.01)

(58) Field of Classification Search
   CPC ...... F21V 29/83; F21V 15/01; F21W 2107/30
   See application file for complete search history.

(56) References Cited

U.S. PATENT DOCUMENTS

| | | | | |
|---|---|---|---|---|
| 2001/0053071 A1* | 12/2001 | Yoda | ................. | G09F 13/04 |
| | | | | 362/23.07 |
| 2010/0093267 A1* | 4/2010 | Hogh | ................. | B60H 1/34 |
| | | | | 454/76 |
| 2013/0077329 A1* | 3/2013 | Hessling | ................ | B62D 47/02 |
| | | | | 362/470 |
| 2014/0268854 A1* | 9/2014 | Wilkinson | ............. | F21S 45/48 |
| | | | | 362/520 |

FOREIGN PATENT DOCUMENTS

| | | |
|---|---|---|
| JP | 2010-033840 A | 2/2010 |
| JP | 2010-033841 A | 2/2010 |
| KR | 10-2011-0022921 A | 3/2011 |
| KR | 10-1735633 B1 | 5/2017 |

* cited by examiner

*Primary Examiner* — Jong-Suk (James) Lee
*Assistant Examiner* — Eric T Eide
(74) *Attorney, Agent, or Firm* — Abelman, Frayne & Schwab

(57) ABSTRACT

Disclosed is an aircraft lamp including a lamp outer case constituted of a lamp housing having an opening and a cover mounted to the lamp housing in a state of closing the opening, the lamp outer case having an inner space formed as an arrangement space, and a light source disposed in the arrangement space, a portion of the lamp housing is provided as a heat sink that releases heat generated when the light source is driven to an outside of the lamp housing, the heat sink is provided with a hole forming portion, and the hole forming portion is formed with an air vent hole communicating with the arrangement space and the outside of the lamp housing.

11 Claims, 4 Drawing Sheets

AIRCRAFT LAMP

CROSS-REFERENCE TO RELATED APPLICATIONS

This application is based on and claims priority from Japanese Patent Application No. 2018-151946, filed on Aug. 10, 2018, with the Japan Patent Office, the disclosure of which is incorporated herein in its entirety by reference.

TECHNICAL FIELD

The present disclosure relates to the technical field of an aircraft lamp in which a light source is disposed inside a lamp outer case.

BACKGROUND

There is an aircraft lamp in which a light source is disposed inside a lamp outer case constituted of a cover and a lamp housing (see, e.g., Japanese Patent Laid-Open Publication Nos. 2010-033840 and 2010-033841).

There are various types of such aircraft lamps according to the application thereof, and examples thereof include an aircraft lamp functioning as a headlight, an aircraft lamp functioning as a marker light, and an aircraft lamp used for inspection and maintenance.

For example, an aircraft lamp used for inspection and maintenance is configured such that the on/off state of a light source is changed according to the operational state of a predetermined operation unit and whether or not the predetermined operation unit is operated normally may be inspected by checking the on/off state of the light source from a window portion of the aircraft lamp.

In addition, there is also an aircraft lamp that emits light to a structure that requires an inspection and maintenance and is used as a lighting in an inspection operation or a maintenance operation of each component.

In the meantime, an aircraft uses a fuel oil as a fuel that obtains power, but an aircraft lamp used for inspection and maintenance may exist around a flow path of the fuel oil, for example, and there is a risk that the fuel oil may be introduced into the aircraft lamp. When the fuel oil is introduced into the aircraft lamp used for inspection and maintenance and the inner space of the aircraft lamp reaches the ignition point of the fuel oil due to heat generated when the light source is driven, an explosion may occur inside the aircraft lamp.

At this time, when embers generated by the explosion are released to the outside of the aircraft lamp, the embers may be splashed on any aircraft lamp other than the aircraft lamp for which the explosion occurred, which may cause chain explosions. Therefore, in relation to the aircraft lamp which is used for inspection and maintenance and in which an explosion may occur, it is necessary to take a measure to prevent the embers from being released to the outside of the aircraft lamp.

Therefore, in a conventional aircraft lamp in which an explosion may occur, a mounting hole is formed in a lamp housing and an exhaust tube called a quench tube is mounted in the mounting hole. When an explosion occurs inside the aircraft lamp with the quench tube mounted thereto, air blast is released to the outside of the aircraft lamp through the quench tube, but embers disappear inside the quench tube and are not released to the outside.

SUMMARY

In the aircraft lamp with the quench tube mounted thereto, since the quench tube is mounted to the lamp housing in a state of protruding, for example, from the rear surface of the lamp housing, thinner design of the aircraft lamp may be hindered.

In addition, a mounting process of mounting the quench tube to the lamp housing is necessary and the number of components of the aircraft lamp increases as much as the quench tube is required, which results in an increase in the manufacturing costs of the aircraft lamp.

Therefore, an object of the present disclosure is to solve the above-mentioned problems, and to take an appropriate measure against an explosion and realize thinner design and reduced manufacturing costs of an aircraft lamp.

First, an aircraft lamp according to the present disclosure includes a lamp outer case constituted of a lamp housing having an opening and a cover mounted to the lamp housing in a state of closing the opening, the lamp outer case having an inner space formed as an arrangement space, and a light source disposed in the arrangement space. A portion of the lamp housing is provided as a heat sink that releases heat generated when the light source is driven to an outside of the lamp housing. The heat sink is provided with a hole forming portion. The hole forming portion is formed with an air vent hole communicating with the arrangement space and the outside of the lamp housing.

Thus, in the event of an explosion, air blast is released to the outside of the aircraft lamp from the air vent hole formed in the heat sink provided as a portion of the lamp housing.

Second, in the above-described aircraft lamp according to the present disclosure, the heat sink may be integrally formed with a portion of the lamp housing other than the heat sink.

Thus, the entire lamp housing is integrally formed.

Third, in the above-described aircraft lamp according to the present disclosure, the lamp housing may be provided with a protrusion as a portion of the hole forming portion, and the protrusion protrudes to an opposite side of the cover.

Thus, the length of the air vent hole is increased as much as a portion of the air vent hole is formed in the protrusion.

Fourth, in the above-described aircraft lamp according to the present disclosure, the heat sink may be provided with a base portion that is provided as a portion other than the hole forming portion and is continuous with the hole forming portion. The hole forming portion may have a thickness greater than a thickness of the base portion. The air vent hole may have an axial direction aligned with a thickness direction of the hole forming portion.

Thus, the thickness of the base portion of the heat sink is less than the thickness of the hole forming portion, and only the hole forming portion in which the air vent hole requiring a certain length or more is formed is thick and the remaining portion of in the heat sink is thin.

According to the present disclosure, since air blast is released to the outside of an aircraft lamp from an air vent hole formed in a heat sink provided as a portion of a lamp housing in the event of an explosion, it is possible to take an appropriate measure against the explosion and realize thinner design and reduced manufacturing costs of the aircraft lamp.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a form for implementing an aircraft lamp of the present disclosure will be described with reference to the accompanying drawings.

In the aircraft lamp, a light source is disposed inside a lamp outer case and the lamp outer case is constituted of a lamp housing and a cover, but, in the following description, front-and-rear, up-and-down, and left-and-right directions are indicated by assuming that the direction in which the lamp housing and the cover are coupled to each other is the front-and-rear direction, the cover is the front, and the lamp housing is the back. These directions are represented by arrows in FIGS. 1 and 2, "F" is forward, "B" is backward, "U" is upward, "D" is downward, "L" is leftward, and "R" is rightward.

In addition, the front-and-rear, up-and-down, and left-and-right directions are merely for convenience of explanation, and the implementation of the present technology is not limited to these directions.

The aircraft lamp 1 is mounted, for example, to a portion of a front wheel mounting plate to which front wheels are mounted as a lamp used for inspection and maintenance. The front wheel mounting plate is movable relative to an airframe, and by movement of the front wheel mounting plate relative to the airframe, the front wheels are stored inside the airframe during flight. A mounting hole for mounting the aircraft lamp 1 is formed in the front wheel mounting plate.

Figure 1:
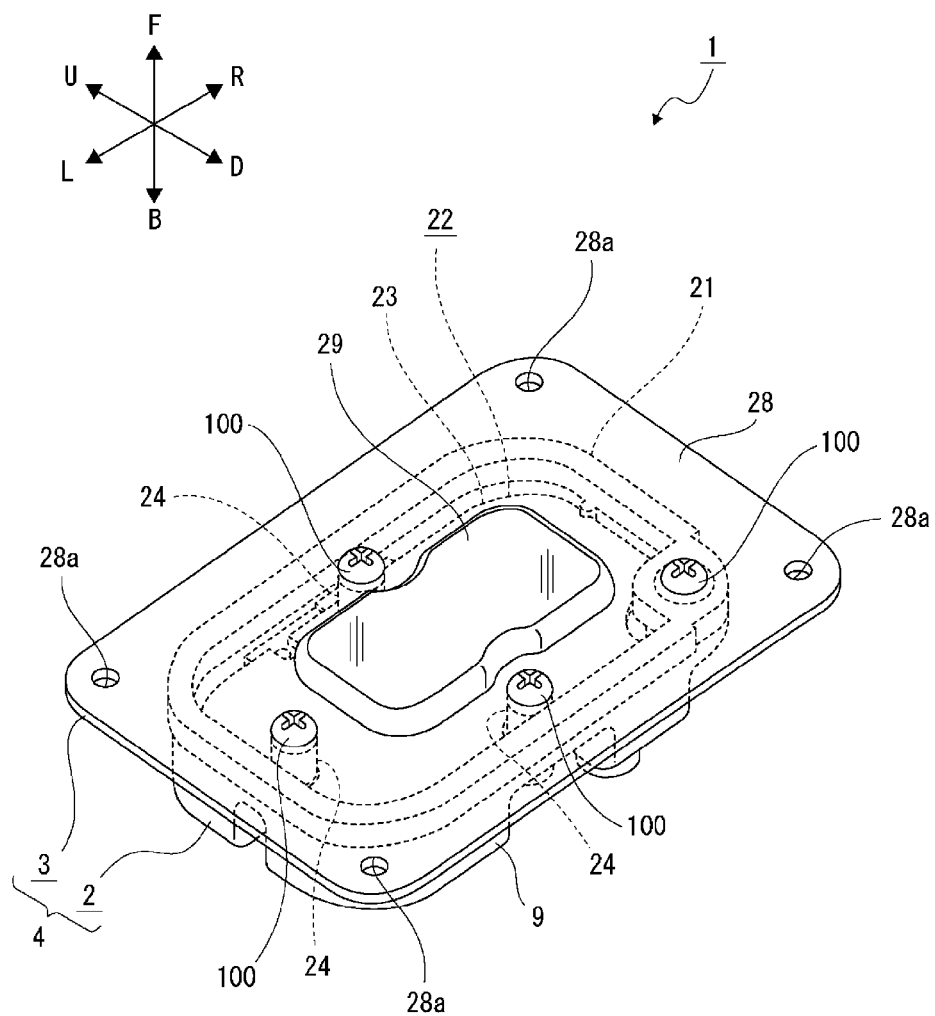
FIG. 1 is a perspective view illustrating an aircraft lamp according to an embodiment of the present disclosure, together with FIGS. 2 to 4.
Figure 2:
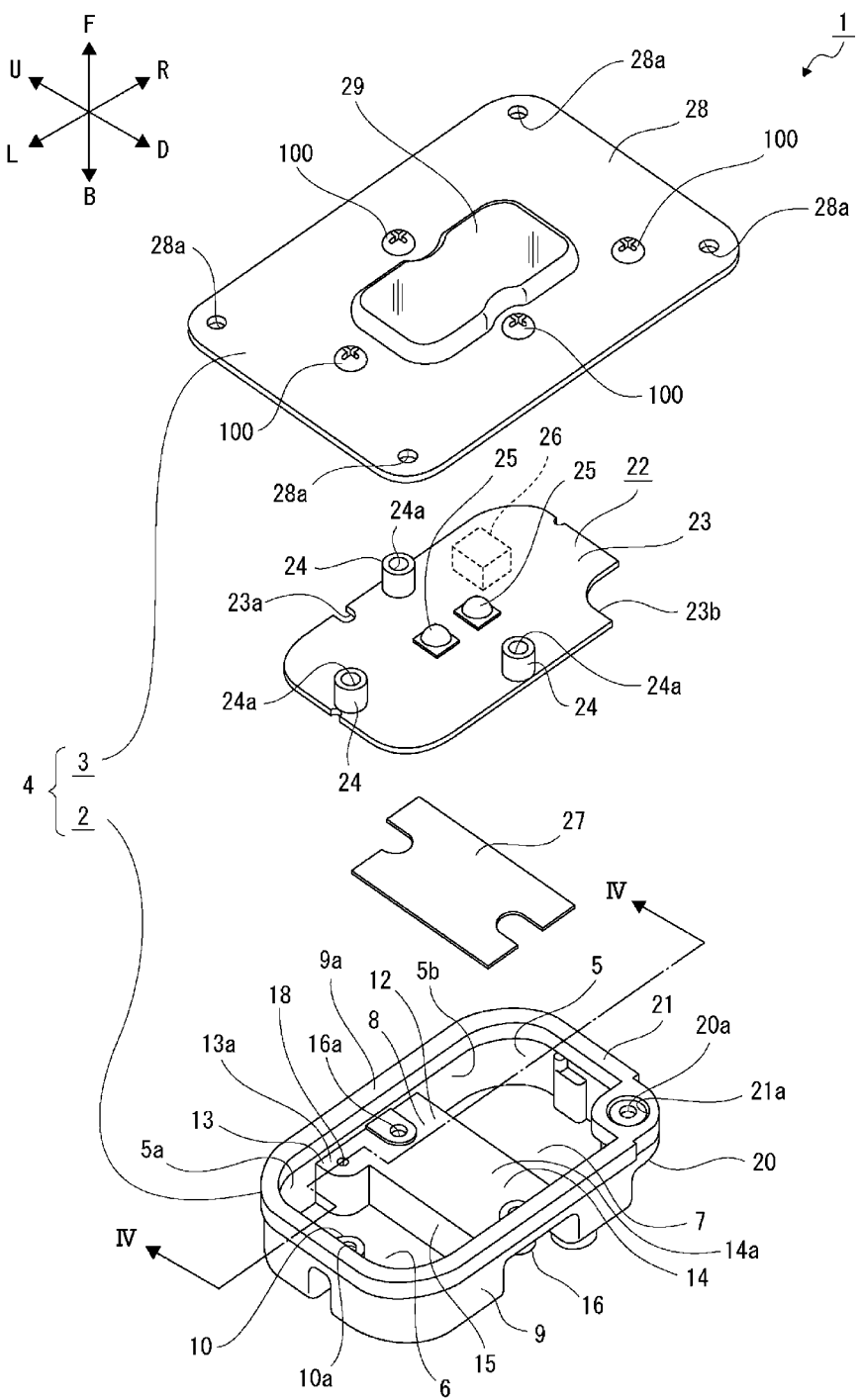
FIG. 2 is an exploded perspective view of the aircraft lamp.

The aircraft lamp 1 includes a lamp housing 2 having an opening in the front end thereof and a cover 3 mounted to the lamp housing 2 in a state of closing the opening in the lamp housing 2 (see FIGS. 1 and 2). The lamp housing 2 and the cover 3 constitute a lamp outer case 4, and the inner space of the lamp outer case 4 is formed as an arrangement space 5.

Figure 3:
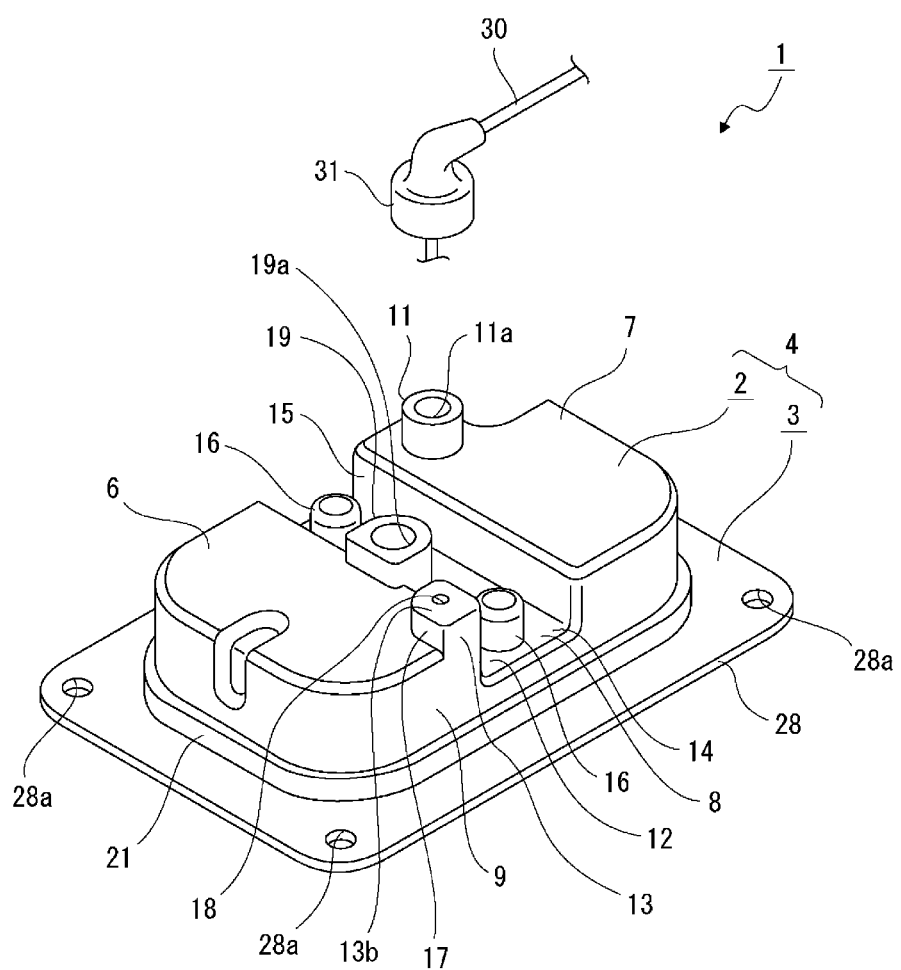
FIG. 3 is a perspective view of a lamp housing.
Figure 4:
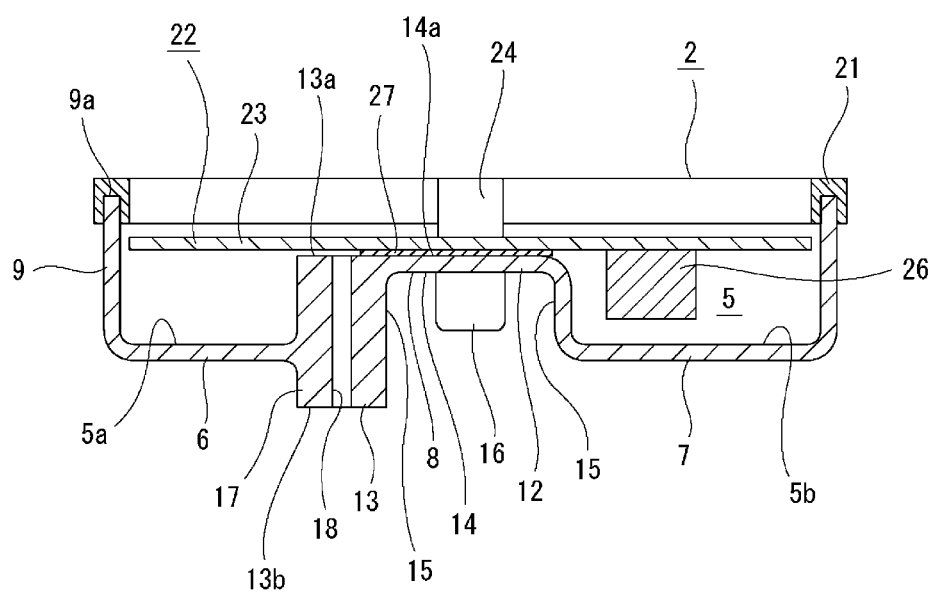
FIG. 4 is a cross-sectional view taken along line IV-IV in FIG. 2.

The lamp housing 2 is formed in a concave shape having an opening in the rear end thereof, and respective portions thereof are integrally formed of, for example, a metal material such as aluminum (see FIGS. 2 to 4). The lamp housing 2 is formed in a flat shape in which the thickness in the front-and-rear direction is less than the width in the left-and-right direction and the width in the up-and-down direction.

The lamp housing 2 includes bottom plate portions 6 and 7 spaced apart from each other in the left-and-right direction to face the front-and-rear direction, a heat sink 8 positioned between the bottom plate portions 6 and 7, and an annular peripheral surface portion 9.

The lamp housing 2 is provided with a mounting boss 10 which protrudes forward from the bottom plate portion 6. The mounting boss 10 is formed with an insertion recess 10a which is opened forward, and a screw groove is formed in the inner peripheral surface thereof. The lamp housing 2 is provided with a connection boss 11 which protrudes backward from the bottom plate portion 7. A connection hole 11a is formed in the front-and-rear direction at a position at which the connection hole extends through the connection boss 11 and the bottom plate portion 7.

The heat sink 8 includes a base portion 12 and a hole forming portion 13.

The base portion 12 includes a contact surface portion 14 formed in a rectangular flat plate shape to face the front-and-rear direction and side surface portions 15 and 15 protruding backward from both the left and right ends of the contact surface portion 14.

The contact surface portion 14 is positioned forward of the bottom plate portions 6 and 7, and the rear ends of the side surface portions 15 and 15 are continuous with one end of the respective bottom plate portions 6 and 7 in the left-and-right direction. Thus, regions of the arrangement space 5 at the left and right sides of the heat sink 8 form large spaces in the front-and-rear direction. The regions at the left and right sides of the heat sink 8 are formed as a first space 5a and a second space 5b.

The heat sink 8 is provided with mounting bosses 16 and 16 which protrude backward from positions near both the upper and lower ends of the contact surface portion 14. Each mounting boss 16 is formed with an insertion recess 16a which is opened forward, and a screw groove is formed in the inner peripheral surface thereof.

The hole forming portion 13 is continuous with the outer surface of the upper end of one side surface portion 15 so that a front surface 13a thereof is positioned on the same plane as a front surface 14a of the contact surface portion 14 and a rear surface 13b thereof is positioned behind a rear surface of the bottom plate portion 6. A portion of the hole forming portion 13 positioned behind the rear surface of the bottom plate portion 6 is provided as a protrusion 17. The hole forming portion 13 is formed with an air vent hole 18 in the front-and-rear direction. Thus, the axial direction of the air vent hole 18 is aligned with the thickness direction of the hole forming portion 13, and the air vent hole 18 communicates with the arrangement space 5 and the outside of the aircraft lamp 1.

The thickness of the hole forming portion 13 in the front-rear direction is greater than the thickness of each of the contact surface portion 14 and the side surface portions 15 and 15 of the base portion 12.

The lamp housing 2 is provided with a grounding boss 19 which protrudes backward from the contact surface portion 14. The grounding boss 19 is formed with an insertion recess 19a which is opened backward.

The peripheral surface portion 9 is continuous with the outer circumference of the bottom plate portions 6 and 7 or both the upper and lower ends of the heat sink 8 and is formed, for example, in a laterally long annular shape. The bottom plate portions 6 and 7 and the heat sink 8 are surrounded from the periphery thereof by the peripheral surface portion 9, and a front surface 9a of the peripheral surface portion 9 is positioned in front of the front surface 14a of the contact surface portion 14. A portion of the peripheral surface portion 9 is provided as a thickness portion 20 which is thicker than the remaining portion. The thickness portion 20 is formed with an insertion recess 20a which is opened forward, and a screw groove is formed in the inner peripheral surface thereof.

A packing 21 is mounted to the peripheral surface portion 9. An exposure hole 21a is formed in the packing 21 at a position corresponding to the thickness portion 20, and the insertion recess 20a is exposed by the exposure hole 21a.

A substrate 22 is disposed in the arrangement space 5 of the lamp housing 2 (see FIGS. 2 and 4). The substrate 22 includes a circuit forming portion 23 formed in a flat plate shape to face the front-rear direction and boss portions 24, 24 and 24 protruding respectively forward from the circuit forming portion 23. The circuit forming portion 23 is smaller than the peripheral surface portion 9 of the lamp housing 2 and has a first notch 23a and a second notch 23b which are opened to the outer circumferential side. A circuit pattern (not illustrated) is formed in the circuit forming portion 23. Insertion through-holes 24a, 24a and 24a are formed in the substrate 22 at positions at which the insertion through-holes extend from the respective boss portions 24, 24 and 24 to the circuit forming portion 23.

For example, two light sources 25 and 25 are mounted on the substrate 22 in the central portion of the front surface of the circuit forming portion 23. For example, a light emitting diode (LED) is used as the light source 25. The light sources 25 and 25 are positioned side by side in the left-and-right direction. A plurality of electronic components (not illustrated) such as a transistor, a resistor, and a capacitor are mounted respectively on both surfaces of the circuit forming portion 23. A connector 26 for the supply of power is mounted to the rear surface of the circuit forming portion 23 (see FIGS. 2 and 4). The connector 26 is connected to a circuit pattern.

The substrate 22 is disposed in the arrangement space 5 in a state where a portion thereof is in contact with the contact surface portion 14 of the heat sink 8 via a heat transfer sheet 27 (see FIG. 4). In a state where the substrate 22 is disposed in the arrangement space 5, the electronic components respectively mounted on both surfaces of the circuit forming portion 23 are mainly positioned in the first space 5a and the second space 5b, and the connector 26 is positioned in the second space 5b. The light sources 25 and 25 are positioned on the front side of the heat transfer sheet 27. In a state where the substrate 22 is disposed in arrangement space 5, the first notch 23a and the second notch 23b are positioned to correspond to the hole forming portion 13 of the heat sink 8 and the thickness portion 20 of the peripheral surface portion 9, respectively. The air vent hole 18 formed in the hole forming portion 13 is not covered by the substrate 22, and the boss portions 24, 24 and 24 are positioned on the front side of the mounting bosses 10, 16 and 16, respectively.

The cover 3 has an outer shape larger than the outer shape of the lamp housing 2 and is mounted to the lamp housing 2 via the packing 21. The cover 3 is constituted of a cover portion 28 having a flat plate shape and a window portion 29 mounted to the central portion of the cover portion 28.

The cover portion 28 is formed of, for example, a metal material such as aluminum. Insertion through-holes 28a, 28a, . . . are formed in four corners of the cover portion 28, respectively. A window hole (not illustrated) is formed in the central portion of the cover portion 28. The window portion 29 is formed of a transparent material such as a resin or glass, and is fixed to the cover portion 28 with no gap by an adhesive in a state of covering the window hole.

The cover portion 28 is mounted to the lamp housing 2 by inserting mounting screws 100, 100 and 100 through the insertion through-holes 24a, 24a and 24a formed in the boss portions 24, 24 and 24 of the substrate 22 and screwing to the mounting bosses 10, 16 and 16 of the lamp housing 2, respectively. At this time, the boss portions 24, 24 and 24 of the substrate 22 are pushed from the front thereof by the cover portion 28 of the cover 3, the circuit forming portion 23 is pressed against the contact surface portion 14 of the heat sink 8 via the heat transfer sheet 27. In addition, the cover portion 28 is also mounted to the lamp housing 2 by screwing the mounting screw 100 to the thickness portion 20 of the lamp housing 2. Since the cover 3 is mounted to the lamp housing 2 via the packing 21, no gap is generated between the cover 3 and the lamp housing 2.

A connection cord 30 connected to a power supply is inserted through the connection hole 11a formed in the connection boss 11 of the lamp housing 2 (see FIG. 3). The connection cord 30 inserted through the connection hole 11a is connected to the connector 26. A portion of the connection cord 30 is covered by a heat-shrinkable rubber tube 31. In a state where a portion of the connection cord 30 is inserted into the rubber tube 31, the inside of the rubber tube 31 is filled with a heat-melting adhesive (not illustrated). The rubber tube 31 is shrunk when the adhesive melts by heating, and thereafter, the inner space of the rubber tube 31 is sealed by natural cooling. In addition, since the rubber tube 31 is heated in a state where a portion thereof covers the connection boss 11, the inner surface of the rubber tube 31 is bonded to the connection boss 11 in the same manner as the connection cord 30.

The current supplied from the power supply by the connection cord 30 is supplied from the circuit pattern to the light sources 25 and 25 and the electronic components mounted on both surfaces of the circuit forming portion 23 via the connector 26, so that light is emitted from the light sources 25 and 25. The light emitted from the light sources 25 and 25 is transmitted through the window portion 29. When the light sources 25 and 25 are driven, heat is generated from the light sources 25 and 25 or the substrate 22, and the generated heat is transferred from the heat transfer sheet 27 to the heat sink 8 and is released from the heat sink 8 to the outside. In addition, the heat generated when the light sources 25 are driven is also released to the outside from a portion of the lamp housing 2 other than the heat sink 8.

A cord (not illustrated) for grounding (earthing) is connected to the insertion recess 19a formed in the grounding boss 19 of the lamp housing 2.

The aircraft lamp 1 configured as described above is fixed to the front wheel mounting plate by inserting the lamp housing 2 into the mounting hole in the front wheel mounting plate and inserting screw members (not illustrated) through the screw insertion through-holes 28a, 28a, . . . formed in the cover portion 28 of the cover 3, respectively, to fasten the screw members to the front wheel mounting plate.

In the aircraft lamp 1, for example, the on/off state of the light sources 25 and 25 is changed according to the operational state of a predetermined operation unit and whether or not the predetermined operation unit is operated normally may be inspected by checking the on/off state of the light sources 25 and 25 from the window portion 29.

When an explosion occurs inside the aircraft lamp 1 described above, since the cover 3 is mounted to the lamp housing 2 so that the arrangement space 5 is sealed and the connection hole 11a in the connection boss 11 is sealed, air blast is released to the outside of the aircraft lamp 1 from the air vent hole 18 which is an only communication path with the outside of the aircraft lamp 1. However, since the air vent hole 18 is formed to have a certain thickness or less and a certain length or more, embers disappear inside the air vent hole 18 and are not released to the outside of the aircraft lamp 1.

As described above, in the aircraft lamp 1, a portion of the lamp housing 2 is provided as the heat sink 8 which releases the heat generated when the light sources 25 and 25 are driven to the outside of the lamp housing 2, the heat sink 18 is provided with the hole forming portion 13, and the hole forming portion 13 is formed with the air vent hole 18 communicating with the arrangement space 5 and the outside of the lamp housing 2.

Thus, since air blast is released to the outside of the aircraft lamp 1 from the air vent hole 18 formed in the heat sink 8 which is provided as a portion of the lamp housing 2 in the event of an explosion, a quench tube is not necessary to discharge air blast to the outside when an explosion occurs, and it is possible to take an appropriate measure against an explosion and realize thinner design and reduced manufacturing costs of the aircraft lamp 1.

In addition, since the heat sink 8 is integrally formed with a portion of the lamp housing 2 other than the heat sink 8, the entire lamp housing 2 is integrally formed, which may increase the strength of the lamp housing 2. In particular, by increasing the strength of a lamp mounted on an aircraft which undergoes a remarkable change in air pressure or temperature, it is possible to prolong the service life of the lamp.

In addition, the protrusion 17 as a portion of the hole forming portion 13 is provided on the lamp housing 2 so as to protrude to the opposite side of the cover 3.

Thus, since the length of the air vent hole 18 is increased as much as a portion of the air vent hole 18 is formed in the protrusion 17, when an explosion occurs in the arrangement space 5, it is possible to surely dissipate embers of the explosion and ensure that the embers are not released to the outside of the lamp housing 2.

In addition, in the heat sink 8, the thickness of the hole forming portion 13 is greater than the thickness of the base portion 12, and the axial direction of the air vent hole 18 is aligned with the thickness direction of the hole forming portion 13.

Thus, the thickness of the base portion 12 of the heat sink 8 is less than the thickness of the hole forming portion 13, only the hole forming portion 13 in which the air vent hole 18 requiring a certain length or more is formed is thick and the remaining portion of the heat sink 8 is thin. Therefore, it is possible to secure a sufficient length of the air vent hole 18 and reduce the weight of the aircraft lamp 1.

In particular, in the aircraft lamp 1, there is a risk that a high voltage may be applied, for example, by lightning, and in order to prevent, for example, damage to the electronic components mounted on the circuit forming portion 23 when a high voltage is applied, the first space 5a and the second space 5b are large in the front-and-rear direction and the distance between the bottom plate portions 6 and 7 and the circuit forming portion 23 is long. Meanwhile, in order to release the heat generated when the light sources 25 and 25 are driven to the outside of the lamp housing 2, it is useful to provide the heat sink 8. Thus, the length of the air vent hole 18 may be made sufficiently long by utilizing the sizes of the first space 5a and the second space 5b in the front-and-rear direction which is the distance between the heat sink 8 and the bottom plate portions 6 and 7. Therefore, it is possible to provide the aircraft lamp 1 with thinner design without unnecessarily increasing the thickness of the aircraft lamp 1 in the front-and-rear direction and to secure a sufficient length of the air vent hole 18 for surely dissipating embers of an explosion.

In addition, since the connector 26 may be disposed in the arrangement space 5 by utilizing the size of the second space 5b in the front-and-rear direction, it is possible to effectively utilize the arrangement space 5 as the arrangement space of the connector 26 and to downsize the aircraft lamp 1 while securing a sufficient arrangement space for the connector 26.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An aircraft lamp comprising:
   a lamp outer case including a lamp housing having an opening and a cover mounted to the lamp housing in a state of closing the opening, the lamp outer case having an inner space formed as an arrangement space; and
   a substrate, on which a light source is mounted, disposed in the arrangement space;
   wherein a portion of the lamp housing is provided as a heat sink that releases heat generated when the light source is driven to an outside of the lamp housing,
   the heat sink is provided with a hole forming portion,
   the hole forming portion is formed with an air vent hole communicating with the arrangement space and the outside of the lamp housing,
   the substrate has a notch that is opened to an outer circumferential side, and
   in a state where the substrate is disposed in the arrangement space, the notch is positioned to correspond to the hole forming portion of the heat sink and the air vent hole formed in the hole forming portion is not covered by the substrate,
   wherein the aircraft lamp is configured to be mounted to an area of an airplane outside of the internal cabin.

2. The aircraft lamp according to claim 1, wherein the heat sink is integrally formed with a portion of the lamp housing other than the heat sink.

3. The aircraft lamp according to claim 1, wherein the lamp housing is provided with a protrusion as a portion of the hole forming portion, and the protrusion protrudes in a direction opposite to the cover.

4. The aircraft lamp according to claim 2, wherein the lamp housing is provided with a protrusion as a portion of the hole forming portion, and the protrusion protrudes in a direction opposite to the cover.

5. The aircraft lamp according to claim 1, wherein the heat sink is provided with a base portion that is provided as a portion other than the hole forming portion and is continuous with the hole forming portion,
   the hole forming portion has a thickness greater than a thickness of the base portion, and
   the air vent hole has an axial direction aligned with a thickness direction of the hole forming portion.

6. The aircraft lamp according to claim 2, wherein the heat sink is provided with a base portion that is provided as a portion other than the hole forming portion and is continuous with the hole forming portion,
   the hole forming portion has a thickness greater than a thickness of the base portion, and
   the air vent hole has an axial direction aligned with a thickness direction of the hole forming portion.

7. The aircraft lamp according to claim 3, wherein the heat sink is provided with a base portion that is provided as a portion other than the hole forming portion and is continuous with the hole forming portion,
   the hole forming portion has a thickness greater than a thickness of the base portion, and the air vent hole has an axial direction aligned with a thickness direction of the hole forming portion.

8. The aircraft lamp according to claim 4, wherein the heat sink is provided with a base portion that is provided as a portion other than the hole forming portion and is continuous with the hole forming portion, the hole forming portion has a thickness greater than a thickness of the base portion, and the air vent hole has an axial direction aligned with a thickness direction of the hole forming portion.

9. The aircraft lamp according to claim 1, wherein the lamp housing includes two bottom plate portions spaced apart from each other in a left-and-right direction thereof to face a front-and-rear direction thereof, and the heat sink is positioned between the two bottom plate portions.

10. The aircraft lamp according to claim 5, wherein the base portion includes a contact surface portion formed in a flat plate shape to face a front-and-rear direction of the lamp housing and side surface portions protruding backward from both left and right ends of the contact surface portion, and the hole forming portion is continuous with an outer surface of an upper end of one of the side surface portions so that a front surface thereof is positioned on the same plane as a front surface of the contact surface portion.

11. The aircraft lamp according to claim 1, wherein the aircraft lamp is configured for inspection and maintenance activities near a flow path of fuel oil.

\* \* \* \* \*